F. W. DUSTAN.
FRUIT SHIPPING BOX.
APPLICATION FILED APR. 15, 1909.

960,288.

Patented June 7, 1910.
2 SHEETS—SHEET 1.

Witnesses
Row S. Johnson
S. M. Ricketts

Inventor
Frederick W. Dustan
By Watson E. Coleman
Attorney

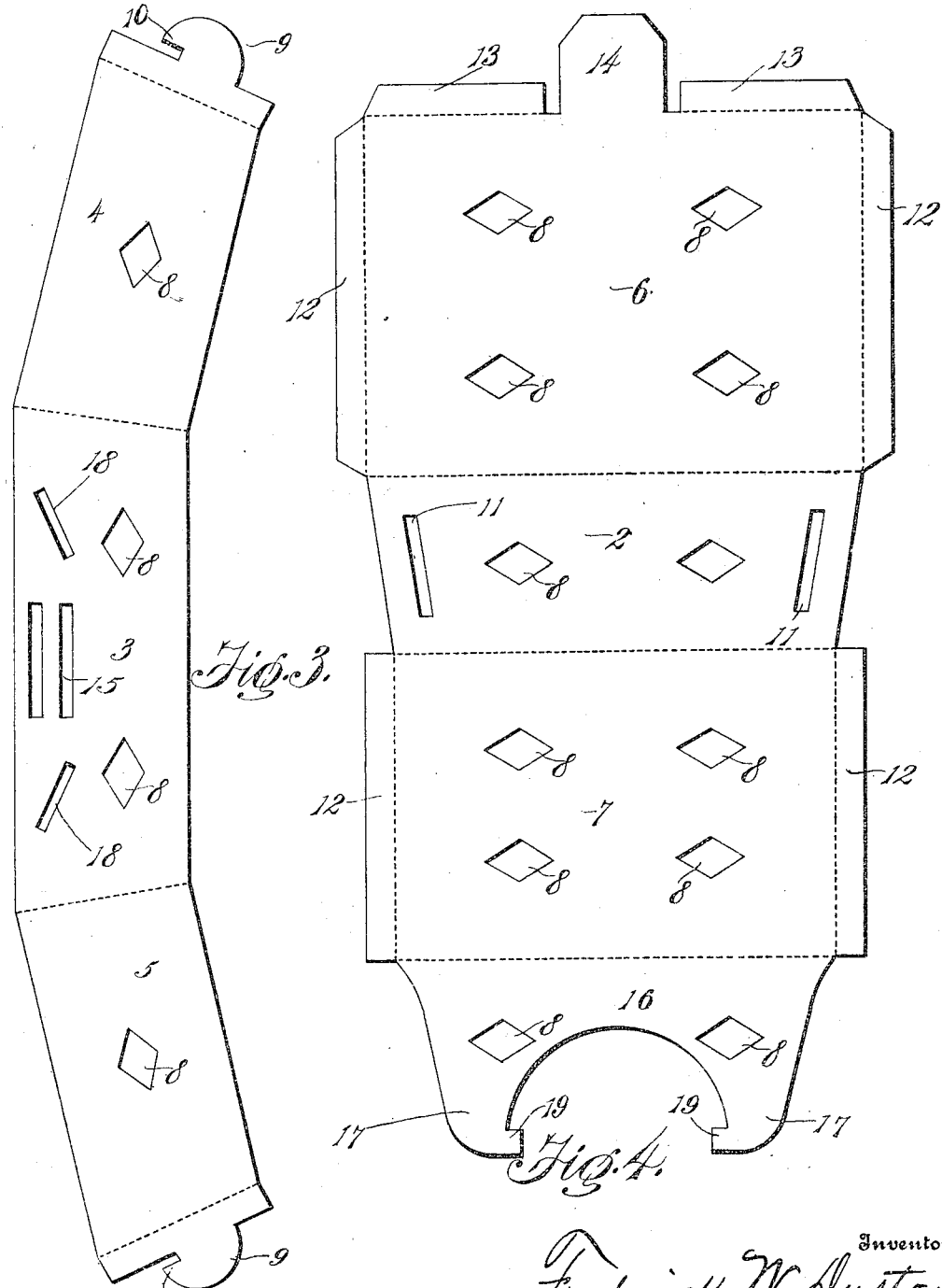

UNITED STATES PATENT OFFICE.

FREDERICK W. DUSTAN, OF CLARKSTON, WASHINGTON.

FRUIT-SHIPPING BOX.

960,288. Specification of Letters Patent. Patented June 7, 1910.

Application filed April 15, 1909. Serial No. 490,070.

*To all whom it may concern:*

Be it known that I, FREDERICK W. DUSTAN, a citizen of the United States, residing at Clarkston, in the county of Asotin and State of Washington, have invented certain new and useful Improvements in Fruit-Shipping Boxes, of which the following is a specification, reference being had to the accompanying drawings.

This invention relates to improvements in boxes for packing and shipping cherries and other small fruit.

One object of the invention is to provide an improved box having both its top and bottom hinged so that the contents of the box may be easily inspected from both the top and the bottom and so that cherries and similar fruit or berries may be more quickly, easily and attractively packed than it is possible to do when the box has a closed bottom.

With the above and other objects in view, the invention consists of the novel features of construction and the combination and arrangement of parts hereinafter fully described and claimed, and illustrated in the accompanying drawings, in which—

Figure 1:
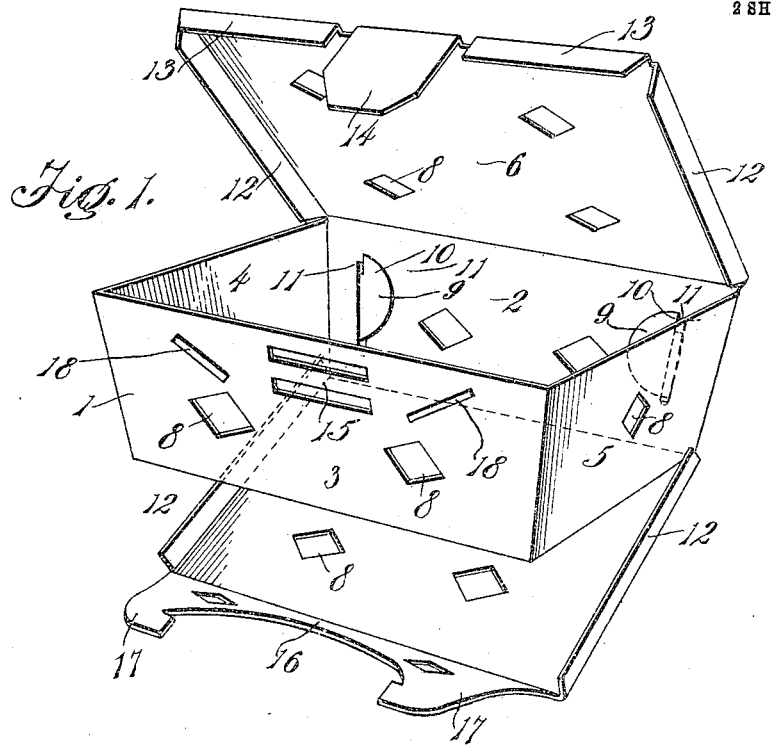
Figure 2:
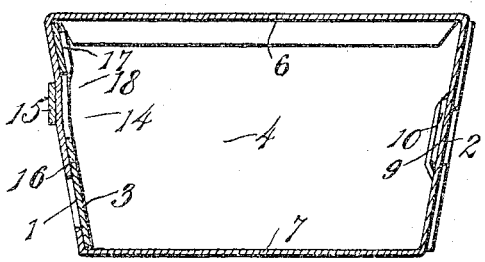

Figure 1 is a perspective view of the improved fruit box showing it with its hinged top and bottom partially open; Fig. 2 is a transverse section through the box with its top and bottom closed; Figs. 3 and 4 are plan views of the two blanks from which the box is made.

The box comprises a rectangular body 1, the sides 2, 3 and the ends 4, 5 of which are preferably inclined downwardly and inwardly and the top and bottom 6, 7 of which are hinged or mounted so that either one can be readily opened to expose the contents of the box. As illustrated, said top and bottom are mounted upon the side 2 and they are provided with tongues or equivalent means for holding them closed. The box is preferably constructed of card-board and in its several walls are formed suitable openings 8 which permit of the free circulation of air through the box and the contents thereof.

While the box may be constructed in any suitable manner it is preferably made from two blanks, one of which comprises the side 2 and the top and bottom 6, 7 and the other of which comprises the side 3 and the two ends 4, 5. The ends 4, 5 are formed integral with the opposite ends of the side 3 and at the free extremities of said ends 4 the latter are bent and shaped to provide locking tongues 9 having hooks 10. Said tongues 9 enter angularly arranged slots 11 formed in the side 2 and their hooks 10 engage the end walls of said slots to retain the tongues therein. The top and bottom are formed integral with the upper and lower edges of the side 2 and the end edges of said top and bottom are bent at right angles to provide rim flanges 12 which engage the inner faces of the ends 4, 5 of the box and serve to strengthen the same when set up for use. Upon the free longitudinal edge of the top are formed rim flanges 13 and a centrally disposed locking tongue 14, which latter is adapted to engage a keeper loop 15 formed by making two parallel slots in the side 3, when said cover 6 is in its closed position. Upon the free longitudinal edge of the bottom 7 is formed a reinforcing side wall or flange 16 adapted to engage the outer face of the side 3 and provided adjacent to its ends with tongues 17 adapted to enter slots or openings 18 formed in said side 3, as will be readily understood upon reference to Figs. 1 and 2 of the drawings. The tongues 17 are formed with hook projections 19 which engage the end walls of the slots 18 and retain said tongues in the latter.

By constructing the box of the two blanks as above set forth, it will be seen that the box may be produced at a small cost, may be easily set up for use and will be strong and rigid when set up. By making the box so that its bottom, as well as its top, can be readily opened it is rendered especially well adapted for the use of fruit growers and packers who handle small fruits, because it permits of the easy inspection of the fruit in the box at both its top and bottom and in the packing of cherries and the like it enables the fruit to be more quickly and easily packed from the top inwardly, it being the practice in packing cherries to pack them with the stems down to render the box or package more attractive.

The preferred manner of packing one of the boxes with cherries is as follows: The blank forming the top, bottom and side 2 is placed in an inverted position upon a table or other flat surface and the flanges 12, 13 are bent to an upright position and a layer of cherries is placed upon the top 6. The tongue 14 is then engaged with the keeper loop 15 and the side 3 and ends 4, 5 forming the other blank are bent around the upstanding flanges 13, 14. The side 2 is then bent upwardly and the tongues 9 bent around it and inserted in the slots 11. The rest of the contents of the box is then packed in the same upon the first layer, which latter, of course, is more carefully and evenly packed. The bottom 7 is then folded over and the tongues 17 inserted in the slots 18 to completely close and fasten the box so that the flanges 12 upon the bottom will engage the outer faces of the ends 4, 5 while the flanges 13, 12 upon the top will engage the inner faces of said ends and the side 3. It will be noted that by having the flanges 13 extend or project within the box that the tongues 17 when inserted in the slots 18 will enter between the flanges 13 and the side 2 so that the fruit in the box will not be bruised, the flanges 13 thus serving to protect the fruit which would otherwise be shoved out of position and possibly bruised.

Having thus described the invention what is claimed is:

The herein described box for shipping fruit, consisting of two perforated cardboard blanks, one blank comprising the front side and the two ends of the box, the ends being folded at an angle to the front and being formed at their extremities with inwardly bent flaps provided with hook-shaped tongues, said front of the box being formed adjacent the center of its upper edge with spaced parallel slots and adjacent its ends with angularly arranged slots, the other blank comprising the rear, top and bottom of the box, said top and bottom being folded upon the longitudinal edges of the back, and the latter being formed adjacent its ends with upright slots to receive the hook-shaped tongues on the end flaps, said bottom being formed at its ends with upwardly bent flanges or flaps, and on its free edge with an upwardly bent flap having a recessed central portion and two inwardly turned hook-shaped ends to enter the angularly arranged slots in the front of the box, said top of the box having at its ends downturned flaps or flanges, and at its free edge with two short downturned flaps and a centrally arranged downturned tongue, the latter being adapted to be passed through the spaced parallel slots at the center of the front of the box, as shown and described.

In testimony whereof I hereunto affix my signature in the presence of two witnesses.

FREDERICK W. DUSTAN.

Witnesses:
FRED M. HINKLY,
E. A. BASS.